(12) United States Patent
Abbatiello et al.

(10) Patent No.: US 11,664,133 B2
(45) Date of Patent: May 30, 2023

(54) POWER CORD ASSEMBLY CONTAINING RECYCLED AND RENEWABLE POLYMERIC COMPOSITIONS

(71) Applicant: Dell Products L.P., Round Rock, TX (US)

(72) Inventors: Nicholas D. Abbatiello, Round Rock, TX (US); Xinhua Tian, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/083,072

(22) Filed: Oct. 28, 2020

(65) Prior Publication Data

US 2022/0130570 A1 Apr. 28, 2022

(51) Int. Cl.
*H01B 3/00* (2006.01)
*H01B 3/42* (2006.01)
*H01B 9/00* (2006.01)
*H01B 13/14* (2006.01)

(52) U.S. Cl.
CPC ............. *H01B 3/42* (2013.01); *H01B 9/00* (2013.01); *H01B 13/148* (2013.01)

(58) Field of Classification Search
CPC ...................................................... H01B 3/00
See application file for complete search history.

(56) References Cited

U.S. PATENT DOCUMENTS

| 4,945,191 A * | 7/1990 | Satsuka | H01B 3/421 174/120 SR |
|---|---|---|---|
| 6,123,277 A | 9/2000 | Drzevitzky et al. | |
| 2008/0081158 A1 | 4/2008 | Winey et al. | |
| 2014/0357775 A1 | 12/2014 | Furuta | |
| 2020/0199455 A1* | 6/2020 | Basin | C07G 1/00 |
| 2020/0243222 A1 | 7/2020 | Nilsson et al. | |

FOREIGN PATENT DOCUMENTS

| KR | 2012085605 | * | 8/2012 |
| WO | 2001/037289 A1 | | 5/2001 |
| WO | WO 2018/232200 | * | 12/2018 |

* cited by examiner

*Primary Examiner* — Chau N Nguyen
(74) *Attorney, Agent, or Firm* — Norton Rose Fulbright US LLP

(57) ABSTRACT

A power cord assembly having a total recycled and renewable content of at least 25 wt. % is described. The power cord assembly can contain a plug at a first end of the power cord configured to be connected to a power source, a connector part at a second end of the power cord opposite to the plug and configured to be connected to an electrical or electronic device, one or more electrically conductive wires extending from the plug to the connector part, one or more insulators surrounding the one or more electrically conductive wires, and an outer jacket extending from the plug to the connector and surrounding the one or more insulators, where at least one of the plug, the connector part, the insulator, or the outer jacket contains a chemically recycled and/or renewably sourced thermoplastic block co-polymer elastomer.

17 Claims, 3 Drawing Sheets

POWER CORD ASSEMBLY CONTAINING RECYCLED AND RENEWABLE POLYMERIC COMPOSITIONS

BACKGROUND OF THE INVENTION

A. Field of the Invention

The invention generally relates to a power cord assembly that can be used for electronic devices (e.g., computers). In particular the invention relates to a power cord assembly that can include high recycle and renewable content while having sufficient mechanical strength.

B. Description of Related Art

Power cords are capable of connecting a device requiring electricity (e.g., an electronic device) to a power source (e.g., a standard wall socket). Due to their use in supplying electricity, power cords have demanding safety performance requirements, especially when such cords are used for computer devices (e.g., desktop or laptops). These requirements have typically been met by using polyvinylchloride (PVC) to form the outer shell or plastic surface area of the plug part, the connector part, or the outer jacket part of the cable that connect the plug part to the connector part of a power cord assemble.

One of the issues of PVC, however, is that it has a relatively high content of a halogen, chlorine. PVC is generally thought of as not being a sustainable or "green" material. Therefore, typical power cord assemblies are not thought of as being made of sustainable material.

Efforts have been made to use mechanically recycled PVC to produce power cord assemblies that are more sustainable. While the use of mechanically recycled PVC can help with the sustainability of the power cord assembly, the assembly typically still includes PVC. Further, mechanical recycling of PVC can have negative effects on the strength of the material. Mechanical recycling typically includes collecting used products or debris having the target polymer (e.g., PVC-based plastics), optionally washing the used products or debris, melting the used products or debris into a raw material having the target polymer, and reusing the raw material to produce new articles of manufacture. The mechanical properties (e.g. tensile strength, tensile modulus, tensile elongation at break etc.) of recycled PVC can decrease due to the input of energy during the melting process, which can lead to polymer chain scissions and lead to weaker polymers. For example, power cords having high mechanically recycled PVC can have low ductility and can become brittle. This can present a significant limit on the amount of recycled material that can be used in articles of manufacture such as power cords of electronic and electrical device.

SUMMARY OF THE INVENTION

A discovery has been made that provides a solution to at least some of the problems that may be associated with improving the sustainability of power cord assemblies, such as a computer power cord assembly. In one aspect, the discovery can include providing a power cord assembly containing a chemically recycled and/or renewably sourced thermoplastic block co-polymer elastomer. In particular, it was found that a power cord containing a thermoplastic block co-polymer elastomer containing i) hard block segments containing a first renewably sourced polymer or a first polymer containing a chemically recycled monomeric unit, and ii) soft block segments containing a second renewably sourced polymer or a second polymer containing a chemically recycled monomeric unit, can have good mechanical properties such as high tensile elongation at break. In some aspects, the power cord assembly of the present invention is free of halogens and/or PVC. Therefore, the power cord assemblies of the present invention can be a more sustainable option from traditional power cords in at least two respects, (1) the use of renewable feed stock and/or chemically recycled material to produce the plastics that can be used in the plug part, the connector part, and/or the outer jacket part of the power cord assembly, and/or (2) the reduced or no reliance on halogen-based materials such as PVC.

Certain aspects are directed to a thermoplastic block co-polymer elastomer. The thermoplastic block co-polymer elastomer can have hard block and soft block segments. In some aspects, the hard block segments can contain a first renewably sourced polymer and/or a first polymer containing a chemically recycled monomeric units. The first polymer, at least in part, can be obtained by chemical recycling, e.g. obtained by polymerizing monomeric units obtained from depolymerizing plastic waste. In some aspects, the soft block segments can contain a second renewably sourced polymer and/or a second polymer containing a chemically recycled monomeric units. The second polymer, at least in part, can be obtained by chemical recycling, e.g. obtained by polymerizing monomeric units obtained from depolymerizing plastic waste. The monomeric units for the first polymer can be same or different from the monomeric units of the second polymer. The plastic waste from which the monomeric units for the first polymer is obtained can be same or different from the waste from which the monomeric units for the second polymer is obtained. The glass transition temperature (Tg) of the hard blocks can be higher than the Tg of the soft blocks. In some aspects, the Tg of the hard blocks can be at least 20° C. higher, or 20° C. to 200° C. higher than the Tg of the soft blocks. In some aspects, the hard blocks can include polyester. In some aspects, the soft blocks can include polyether. In certain aspects, the hard blocks can include polybutylene terephthalate (PBT). In certain aspects, the soft blocks can include polytetramethyleneoxide (PTMO). In certain aspects, the thermoplastic block co-polymer elastomer can be a PBT—PTMO block copolymer, wherein the hard block segments contain PBT and the soft block segments contain PTMO. The PBT can be a reaction product of polymerizing 1,4 butane diol (BDO) with terephthalic acid. In some aspects, at least a portion of the 1, 4 BDO used for polymerization with the terephthalic acid, can be obtained from a first bio-renewable source. The terephthalic acid used for polymerization can be at least in part obtained by chemical recycling. In certain aspects, the terephthalic acid used for polymerization can be at least in part obtained by chemical recycling of polyalkylene terephthalate waste. In certain aspects, the polyalkylene terephthalate can be polyethylene terephthalate (PET). The PTMO can be obtained by polymerizing 1,4-BDO. In some aspects, at least a portion of the 1, 4 BDO used to form PTMO can be obtained from a second bio-renewable source. In some aspects, the first and second bio-renewable source can independently be tall oil, caster beans, sugar, lignocellulose, waste carbon dioxide ($CO_2$), or glycerol. The waste $CO_2$ can be post industrial waste $CO_2$. In some aspects, 20 wt. % to 90 wt. % of the thermoplastic block co-polymer elastomer can be renewably sourced and/or chemically recycled, in other words, the total renewable content and chemically recycled content of the thermoplastic block co-polymer elastomer can be 20 wt. % to 90 wt. %. In some aspects, the thermoplastic block co-polymer elastomer can contain less than 1 wt. %, or less than 0.5 wt. %, or less than 0.1 wt. %, or less than 0.05 wt. %, or less than 0.01 wt. %, or essentially free of, or free of halogens. In some aspects, the thermoplastic block co-polymer elastomer can be comprised in a resin composition.

Certain aspects are directed to a resin composition containing a thermoplastic block co-polymer elastomer described herein. The resin composition can contain 30 wt. % to 90 wt. %, or 30 wt. % to 80 wt. %, or 40 wt. % to 60 wt. % of the thermoplastic block co-polymer elastomer. The resin composition can further contain a flame retardant, preferably 5 wt. % to 15 wt. % of the flame retardant. In some aspects, the flame retardant can be obtained from a renewable source. In some aspects, the flame retardant can be a non-halogenated phosphorus containing flame retardant obtained from bio based chemicals. In some aspects, the resin composition can contain a polyphenylene ether. In certain aspects, the resin composition can further contain an additive selected from the group pigments, plasticizers, antioxidants, UV-stabilizers, heat stabilizers, dye enhancing agents, lubricant, mold release agents, crystal nucleating agents, fluidability-improving agents, antistatic agents, anti-drip agents or any combination thereof. In some aspects, the resin composition can contain less than 1 wt. %, or less than 0.5 wt. %, or less than 0.1 wt. %, or less than 0.05 wt. %, or less than 0.01 wt. %, or essentially free of, or free of polyvinyl chloride (PVC). In some aspects, the resin composition can contain less than 1 wt. %, or less than 0.5 wt. %, or less than 0.1 wt. %, or less than 0.05 wt. %, or less than 0.01 wt. %, or essentially free of, or free of halogens. The resin composition can have any one of, any combination of, or all of the following properties: a density of 1.0 g/cc to 1.2 g/cc at 23° C. measured in accordance with ISO 1183; a tensile modulus equal to or greater than 30 MPa, preferably 36 MPa to 70 MPa at 23° C., as measured in accordance with ISO 527 at 5 mm/min; a tensile strength at break equal to or greater than 8 MPa, preferably 8.5 MPa to 11 MPa at 23° C., as measured in accordance with ISO 527 at 5 mm/min; and a tensile elongation at break equal to or greater than 300%, at 23° C., as measured in accordance with ISO 527 at test speed of 5 mm/min. In some aspects, the resin composition can be comprised in a film, layer, or a sheet. In some aspects, the resin composition can be an extrusion molded, blow-molded, injection-molded, rotational molded, compression molded, 3-D printed, and/or thermoformed composition. In some aspects, the resin composition can be comprised in an article of manufacture. In some aspects, the article can be a computer part or accessory. In some aspects, the article can be a power cord assembly of a computer, or a power cord assembly of an adaptor e.g. AC adaptor for a computer.

Certain aspects are directed to a power cord assembly. The power cord assembly, can be a power cord assembly of a computer or an adaptor for a computer. In certain aspects, the power cord assembly can contain a plug at a first end of the power cord assembly configured to be connected to a power source, a connector part at a second end of the power cord assembly opposite to the plug and configured to be connected to an electrical or electronic device, one or more electrically conductive wires extending from the plug to the connector part, one or more insulators surrounding the one or more electrically conductive wires, and an outer jacket extending from the plug to the connector part and surrounding the one or more insulators. At least one of the plug, the connector part, the insulator(s), or the outer jacket can independently contain a thermoplastic block co-polymer elastomer of the present invention and/or a resin composition of the present invention containing a thermoplastic block co-polymer. In some aspects, the plug can contain a thermoplastic block co-polymer elastomer and/or resin composition described herein. In some aspects, the connector part can contain a thermoplastic block co-polymer elastomer and/or resin composition described herein. In some aspects, the one or more insulators can contain a thermoplastic block co-polymer elastomer and/or resin composition described herein. In some aspects, the outer jacket can contain a thermoplastic block co-polymer elastomer and/or resin composition described herein. In some aspects, the plug, and the connector part can independently contain a thermoplastic block co-polymer elastomer and/or resin composition described herein. In some aspects, the plug, and the one or more insulators, can independently contain a thermoplastic block co-polymer elastomer and/or resin composition described herein. In some aspects, the plug, and the outer jacket can independently contain a thermoplastic block co-polymer elastomer and/or resin composition described herein. In some aspects, the connector part and the one or more insulators independently can contain a thermoplastic block co-polymer elastomer and/or resin composition described herein. In some aspects, the connector part and the outer jacket can independently contain a thermoplastic block co-polymer elastomer and/or resin composition described herein. In some aspects, the one or more insulators and the outer jacket can independently contain a thermoplastic block co-polymer elastomer and/or resin composition described herein. In some aspects, the plug, the connector part, and the one or more insulators can independently contain a thermoplastic block co-polymer elastomer and/or resin composition described herein. In some aspects, the plug, the connector part, and the outer jacket can independently contain a thermoplastic block co-polymer elastomer and/or resin composition described herein. In some aspects, the plug, the one or more insulators, and the outer jacket can independently contain a thermoplastic block co-polymer elastomer and/or resin composition described herein. In some aspects, the connector part, the one or more insulators, and the outer jacket can independently contain a thermoplastic block co-polymer elastomer and/or resin composition described herein. In some aspects, the plug, the connector part, the one or more insulators, and the outer jacket can independently contain a thermoplastic block co-polymer elastomer and/or resin composition described herein. The thermoplastic block co-polymer elastomers and/or the resin compositions in the different parts of the power cord assembly (e.g. plug, the connector part, the insulator(s), or the outer jacket), if present, can be same or different. In some aspects, the thermoplastic block co-polymer elastomer can be PBT-PTMO block copolymer, and the PBT-PTMO block copolymer, in the different parts of the power cord assembly (e.g. plug, the connector part, the insulator(s), or the outer jacket), if present, can be same or different. For, example the PBT and/or PTMO block lengths in the block copolymer, the arrangement of the PBT-PTMO blocks in the block copolymer, one or more properties of the block copolymer, in the different parts of the power cord assembly can be same or different.

In some aspects, the one or more electrically conductive wires can contain copper (Cu). In some aspects, at least a portion of the Cu can be recycled Cu. In some aspects, the Cu containing electrically conductive wires can have a total recycled Cu content of 10 wt. % to 90 wt. %, or 20 wt. % to 60 wt. %. The total recycled, such as chemically recycled and renewable content of the power cord assembly can be 25 wt. % to 65 wt. %.

Certain aspects, are directed to the plug of the power cord assembly. The plug can contain a shell and at least one electrically conductive prong configured to be extendable into an electrical outlet, wherein the electrically conductive prong extends away from a surface of the shell. The shell of the plug can contain a thermoplastic block co-polymer elastomer and/or a resin composition described herein. In some aspects, the plug can be a 2 or 3 pin male plug. In some aspects, the plug can contain 2 electrically conductive prongs. In some aspects, the plug can contain 3 electrically conductive prongs. In some aspects, the plug can contain more than 3 electrically conductive prongs. The electrically conductive prong(s) of the plug can be electrically connected to the electrically conductive wires of the power cord assembly. In some aspects, 10 wt. % to 70 wt. % of the plug can be renewably sourced and/or chemically recycled, e.g. total renewable and chemically recycled content of the plug can be 10 wt. % to 70 wt. %.

Certain aspects are directed to the connector part of the power cord assembly. The connector part can contain a shell and at least one electrically conductive receiver or prong configured to electrically contact a conductive prong or an receiver of an electrical or electronic device. The shell of the connector part can contain a thermoplastic block co-polymer elastomer and/or a resin composition described herein. In some aspects, the electrical or electronic device can be a computer, or an adapter, such as an AC adaptor of a computer. The connecter part can be a female connector or male connector. In some aspects, the connecter part can be a female connector and can contain at least one electrically conductive receiver configured to electrically contact a conductive prong of an electrical or electronic device. In some aspects, the connecter part can be a male connector and can contain at least one electrically conductive prong extendable into and configured to electrically contact a conductive receiver of an electrical or electronic device. In some aspects, the connector part can be 2 or 3 pin and male or female connector. In some aspects, the connector part can contain 2 electrically conductive receivers or prongs. In some aspects, the connector part can contain 3 electrically conductive receivers or prongs. In some aspects, the connector part can contain more than 3 electrically conductive receivers or prongs. The electrically conductive prong(s) or receiver(s) of the connector can be electrically connected to the electrically conductive wires of the power cord assembly. In some aspects, 10 wt. % to 70 wt. % of the connector part can be renewably sourced and/or chemically recycled, e.g. total renewable and chemically recycled content of the connector part can be 10 wt. % to 70 wt. %.

In some aspects, the power cord assembly, the plug, the connector part, the insulator(s), and/or the outer jacket independently can contain less than 1 wt. %, or less than 0.5 wt. %, or less than 0.1 wt. %, or less than 0.05 wt. %, or less than 0.01 wt. %, or essentially free of, or free of polyvinyl chloride (PVC). In some aspects, the power cord assembly, the plug, the connector part, the insulator(s), and/or the outer jacket independently can contain less than 1 wt. %, or less than 0.5 wt. %, or less than 0.1 wt. %, or less than 0.05 wt. %, or less than 0.01 wt. %, or essentially free of, or free of halogens.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment discussed herein can be implemented with respect to any method or composition of the invention, and vice versa. Furthermore, compositions the invention can be used to achieve methods of the invention.

The following includes definitions of various terms and phrases used throughout this specification.

As used herein recycle content of a material refers to wt. % of the material obtained from, made from and/or recovered from waste. Unless mentioned otherwise the waste can be post-industrial and post-consumer waste. Post-consumer waste of a material is a waste generated by a customer of a substrate containing the material. Post-industrial waste is waste generated during a production process of a product and has not used in the consumer market.

As used herein renewable content of a material refers to wt. % of the material obtained from or made from a bio-based renewable material. Unless mentioned otherwise, bio-based material can include materials from any life form such as plants, animals, fungi, protists, prokaryotes, microbes, algae, bacteria, yeasts and/or moulds. The bio-based material can be obtained from natural or genetically engineered species.

As used herein total recycled and renewable content of a material refers to wt. % of the material obtained from, made from and/or recovered from waste and wt. % of the material obtained from or made from a bio-based renewable material. For example for a 100 gm material is 10 gm is obtained recycled sourced and 10 gm is obtained from renewable source, the total recycled and renewable content of the material is 20 wt. %.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component. The term "ppm" refer to parts per million by weight, based on the total weight, of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The power cord assembly of the present invention can "comprise," "consist(s) essentially of," or "consist of" particular ingredients, components, compositions, etc. disclosed throughout the specification. In one aspect of the present invention, and with reference to the transitional phrase "consist(s) essentially of" or "consisting essentially of," a basic and novel characteristic of the present invention can include power cord assembly containing a thermoplastic block co-polymer elastomer and having a high chemical recycle and renewable content.

All publications mentioned herein are incorporated herein by reference to disclose and describe the methods and/or materials in connection with which the publications are cited.

Other objects, features and advantages of the present invention will become apparent from the following detailed description and examples. It should be understood, however, that the detailed description and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings. While the invention is susceptible to various modifications and alternative forms, specific embodiments thereof are shown by way of example in the drawings. The drawings may not be to scale.

FIG. 3A) top cross-sectional view and FIG. 3B) top view of the power cord assembly of FIG. 2, showing the conducting wires, insulator(s) within the outer jacket.

DETAILED DESCRIPTION OF THE INVENTION

A discovery has been made that provides a solution to at least some of the problems that may be associated with increasing the sustainability of traditional power cord assemblies, such as a computer power cord assembly. In particular, it was found that a power cord containing a thermoplastic block co-polymer elastomer containing i) hard block segments containing a first renewably sourced polymer or a first polymer containing a chemically recycled monomeric unit, and ii) soft block segments containing a second renewably sourced polymer or a second polymer containing a chemically recycled monomeric unit, can have good mechanical properties such as high tensile elongation at break and have high recycled and renewable content.

Figure 1:
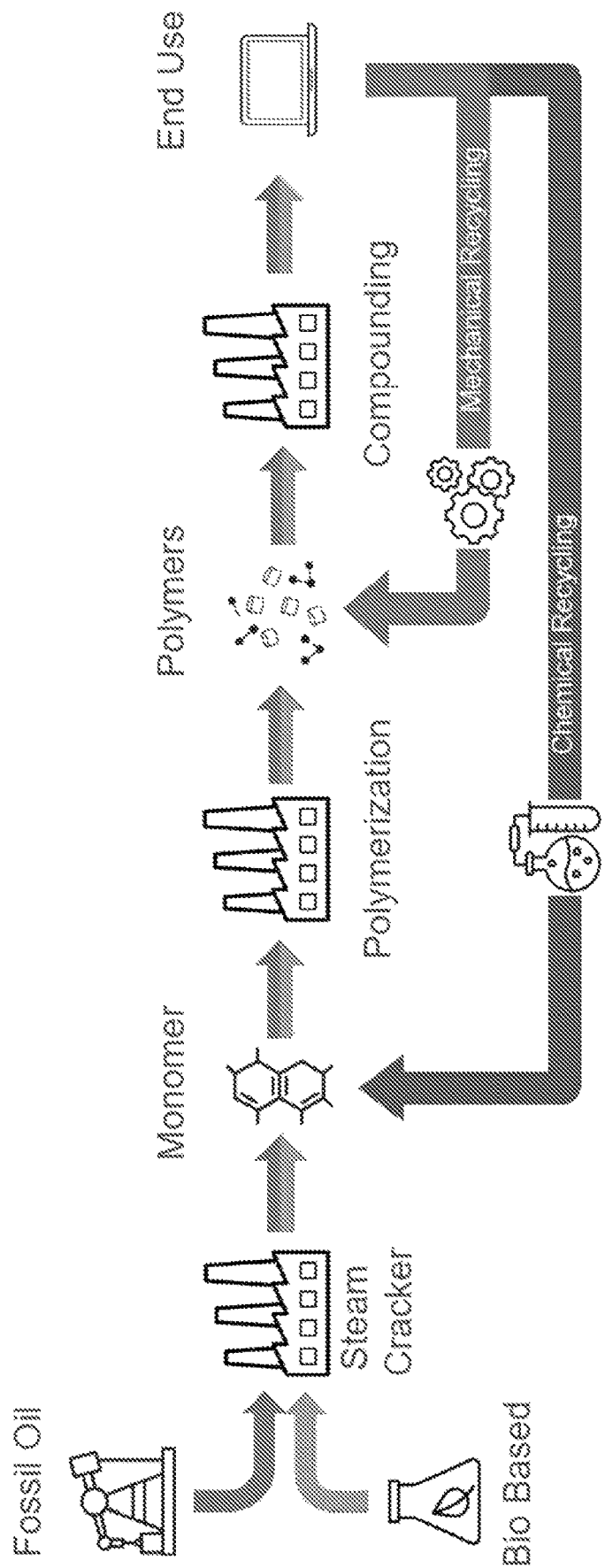
FIG. 1 illustrates a schematic of various polymer recycling methods.

Referring to FIG. 1, a schematic of polymer plastics recycling methods is provided. Polymers (e.g., polyvinyl chloride (PVC)) derived from fossil oil can be used to form various articles of manufacture (e.g., power cord assembly of computer or computer adapter), which after use can become waste. Polymers are primarily recycled from the waste through mechanical recycling. In mechanical recycling, the waste is recycled through physical processes where the polymer chains are not reduced into monomer units forming the polymer. Rather, mechanical recycling typically includes collecting the waste having the target polymer (e.g., PVC-based plastics), optionally washing the waste, melting the waste into a raw material having the target polymer, and reusing the raw material to produce new articles of manufacture. However, the mechanical properties of the mechanically recycled polymer can decrease due to the heat used in melting. The heat can weaken the molecular chains of the polymers. Polymers can also be recycled from waste by chemical recycling. In chemical recycling the polymers from the waste is depolymerized into the monomer units and the monomer units are re-polymerized to form the chemically recycled polymer. Further, polymers formed from bio-based chemicals can be also used to form the articles of manufacture increasing the renewable content of the articles. In certain aspects of the present invention, recycled and renewable content of a power cord assembly is increased while maintaining the desired mechanical properties of the power cord assembly by using a chemically recycled and renewably sourced thermoplastic block co-polymer elastomer instead of mechanically recycled PVC.

These and other non-limiting aspects of the present invention are discussed in further detail in the following sections.

A. Thermoplastic Block Co-Polymer Elastomer

The thermoplastic block co-polymer elastomer can contain hard block and soft block segments. The hard block segments can be rigid (e.g. at room temperature) and can have a glass transition temperature (Tg) higher than the room temperature (~25° C.). The soft block segments can be rubbery (e.g. at room temperature) and can have Tg lower than the room temperature (~25° C.). The difference of Tg between the hard blocks and the soft blocks can be at least 20° C., such as 20° C. to 200° C., as measured using differential scanning calorimetry (DSC). The hard blocks and soft blocks, in the thermoplastic block co-polymer elastomer, can be arranged in any suitable order or sequence, including but not limited to diblock copolymer (A-B), triblock copolymer (A-B-A or B-A-B) or multi-block copolymer ((A-B)$_n$), A being the hard block and B being the soft block. In some aspects, the thermoplastic block co-polymer elastomer can be a multi-block copolymer ((A-B)$_n$). In certain aspects, the hard block can contain a polyester. In some particular aspects, the polyester can be PBT. In certain aspects, the soft block can contain a polyether. In some particular aspects, the polyether can be poly(tetramethylene oxide) (PTMO). In some aspects, the thermoplastic block co-polymer elastomer can be a polyester-polyether block copolymer, containing polyester containing hard blocks and polyether containing soft blocks. In certain aspects, the thermoplastic block co-polymer elastomer can be a PBT-PTMO block co-polymer, containing PBT containing hard blocks and PTMO containing soft blocks. In some aspects, the PBT-PTMO block co-polymer can have the chemical formula of formula (1)

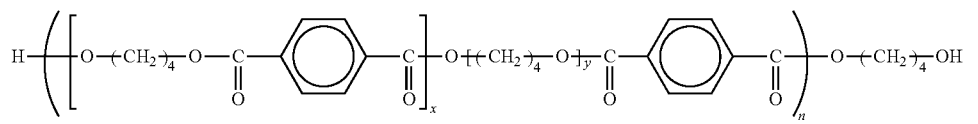

(1)

where x, and y are integers and can be same or different, and n is an integer.

The PBT-PTMO block co-polymer can be obtained by methods known in the art. In some particular aspects, the PBT can be obtained from 1, 4-butanediol (BDO) and terephthalic acid. In some particular aspects, 1, 4-BDO can be reacted with terephthalic acid and/or a terephthalic acid derivative to produce PBT. The terephthalic acid derivative, such as dimethyl terephthalate, can be obtained from terephthalic acid. The terephthalic acid, e.g. used directly or indirectly (via terephthalic acid derivative) to form PBT, at least in part, can be obtained by chemical recycling of polyethylene terephthalate (PET) containing waste. The PET from waste can be depolymerized to form the terephthalic acid. PET can be depolymerized by methods known in the art. Non-limiting examples of PET waste includes post-consumer plastic bottles waste, textile waste or like, containing PET. In certain aspects, the PET waste can be PET containing Ocean-Bound-Plastic waste. Ocean-Bound-Plastic waste refers to plastic waste that is in risk of ending up in the oceans. In some aspects, at least a portion of the 1, 4-BDO used to obtain PBT can be obtained from a first bio-based renewable source. In some particular aspects, 30 wt. % to 50 wt. %, or at least any one of, equal to any one of, or between any two of 30, 35, 40, 45 and 50 wt. %, of the 1, 4-BDO used to obtain PBT can be obtained from the first bio-based renewable source. In some aspects, the first bio-based renewable source can be sugar, lignocellulose, and/or glycerol. The 1, 4-BDO can be obtained from the first bio-based renewable source by methods known in the art including but not limited to GENO BDO™ process.

The PTMO can be obtained from 1, 4-BDO. In some aspects, at least a portion of the 1, 4-BDO used to obtain PTMO can be obtained from a second bio-based renewable source. In some particular aspects, 30 wt. % to 50 wt. %, or at least any one of, equal to any one of, or between any two of 30, 35, 40, 45 and 50 wt. %, of the 1, 4-BDO used to obtain PTMO can be obtained from the second bio-based renewable source. In some aspects, the second bio-based renewable source can be sugar, lignocellulose, and/or glycerol. The 1, 4-BDO can be obtained from the second bio-based renewable source by methods known in the art including but not limited to GENO BDO™ process.

In some aspects, the total renewable content and chemically recycled content of the thermoplastic block co-polymer elastomer can be 20 wt. % to 90 wt. %, or at least any one of, equal to any one of, or between any two of 20, 25, 30, 35, 40, 45, 50, 55, 60, 65, 70, 75, 80, 85 and 90 wt. %.

B. Compositions Containing the Thermoplastic Block Co-Polymer Elastomer

The thermoplastic block co-polymer elastomer, such as the PBT-PTMO block co-polymer, described herein can be comprised in a resin composition. Aspects of the disclosure also relate to resin composition including the thermoplastic block co-polymer elastomer described herein. In some aspects, the resin composition can further contain a flame retardant. In some aspects, the flame retardant can be obtained, at least in part, from a renewable source. In some aspects, the renewable content of the flame retardant can be 30 wt. % to 50 wt. %, or at least any one of, equal to any one of, or between any two of 30, 35, 40, 45 and 50 wt. %. In some aspects, the flame retardant can be a non-halogenated flame retardant. In some aspects, the flame retardant can be a non-halogenated phosphorus containing flame retardant obtained from bio-based chemicals. In some aspects, the bio-based chemicals can be tannin, tannic acid, phytic acid, isosorbide, diphenolic acid, deoxyribonucleic acid (DNA), lignin, or β-cyclodextrin or any combination thereof. In some aspects, the flame retardant can contain Bisphenol-A-diphosphate obtained from bio-based chemicals. In some aspects, the resin composition can contain a polyphenylene ether.

In certain aspects, the resin composition can further contain an additive selected from the group pigments, plasticizers, antioxidants, UV-stabilizers, heat stabilizers, dye enhancing agents, lubricant, mold release agents, crystal nucleating agents, fluidability-improving agents, antistatic agents, anti-drip agents or any combination thereof.

The resin composition can contain 30 wt. % to 90 wt. %, or 30 wt. % to 80 wt. %, or 40 wt. % to 60 wt. %, or at least any one of, equal to any one of, or between any two of 30, 35, 40, 45, 50, 55, 60, 65, 70, 75, 80, 85 and 90 wt. % of the thermoplastic block co-polymer elastomer, and/or 5 wt. % to 15 wt. %, or at least any one of, equal to any one of, or between any two of 5, 6, 7, 8, 9, 10, 11, 12, 13, 14 and 15 wt. % of a flame retardant.

The resin composition can have any one of, any combination of, or all of the following properties: a density of 1.0 g/cc to 1.2 g/cc, or at least any one of, equal to any one of, or between any two of 1, 1.05, 1.1, 1.15 and 1.2 g/cc at 23° C. measured in accordance with ISO 1183; a tensile modulus equal to or greater than 30 MPa, preferably 36 MPa to 70 MPa, or at least any one of, equal to any one of, or between any two of 30, 35, 36, 40, 45, 50, 55, 60, 65, and 70 Mpa at 23° C., as measured in accordance with ISO 527 at 5 mm/min; a tensile strength at break equal to or greater than 8 MPa, preferably 8.5 MPa to 11 MPa, or at least any one of, equal to any one of, or between any two of 8, 8.5, 9, 9.5, 10, 10.5, and 11 MPa at 23° C., as measured in accordance with ISO 527 at 5 mm/min; and a tensile elongation at break equal to or greater than 300%, at 23° C., as measured in accordance with ISO 527 at test speed of 5 mm/min.

C. Methods for Making Compositions Containing the Thermoplastic Block Co-Polymer Elastomer The resin compositions containing the thermoplastic block co-polymer elastomer can be made by various methods known in the art such as extrusion, injection molding, compression molding, blow molding, rotational molding, thermoforming, 3-D printing or any combination thereof. For example the components, such as the thermoplastic block co-polymer elastomer, flame retardant, optional polyphenylene ether and/or the optional additives can be mixed together and then melt-blended to form the resin composition.

In some aspects, the one or any foregoing components described herein may be first dry blended with each other, or dry blended with any combination of foregoing components, then fed into an extruder from one or multi-feeders, or separately fed into an extruder from one or multi-feeders. The extruders used in the invention may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations comprising at least one of the foregoing. The extruder can generally be operated at a temperature higher than that necessary to cause the composition to melt and flow. In some aspects, the temperature of the melt in the extruder barrel can be maintained as low as possible in order to avoid excessive thermal degradation of the components. The melted composition exits extruder through small exit holes in a die. The extrudate can be quenched in a water bath and pelletized. The pellets so prepared can be of any desired length (e.g., one-fourth inch long or less). Such pellets can be used for subsequent molding, shaping, or forming.

Mixtures including any combination of the foregoing mentioned components may be subjected to multiple blending and forming steps if desirable. For example, the composition may first be extruded and formed into pellets. The pellets may then be fed into a molding machine where it may be formed into any desirable shape or product. In some aspects, the composition emanating from a single melt blender may be formed into sheets or strands and subjected to post-extrusion processes such as annealing, uniaxial or biaxial orientation.

D. Articles of Manufacture

The thermoplastic block co-polymer elastomers and/or resin compositions described herein can be comprised in an article of manufacture. Aspects of the disclosure also relate to articles including the thermoplastic block co-polymer elastomer and/or resin composition described herein. In some aspects the article can be a film, a sheet, a molded article, a welded article, a filament, or a powder. In one example, the thermoplastic block co-polymer elastomer and/or resin composition can be incorporated into a film. The film may include at least one film layer that includes the thermoplastic block co-polymer elastomer and/or resin composition. In further aspects the film includes at least a second film layer. Other film layers may include other materials.

In some aspects, the article can be a computer part or accessory. The computer can be desktop computer, laptop computer, notebook computer, cell phone, computer tablet, calculator or the like. In some particular aspects, the article can be a power cord assembly of a desktop computer or a power cord assembly of an adapter, such as AC adapter of the desktop computer. In some particular aspects, the article can be a power cord assembly of a laptop computer or a power cord assembly of an adapter, such as AC adapter of the laptop computer.

Figure 2:
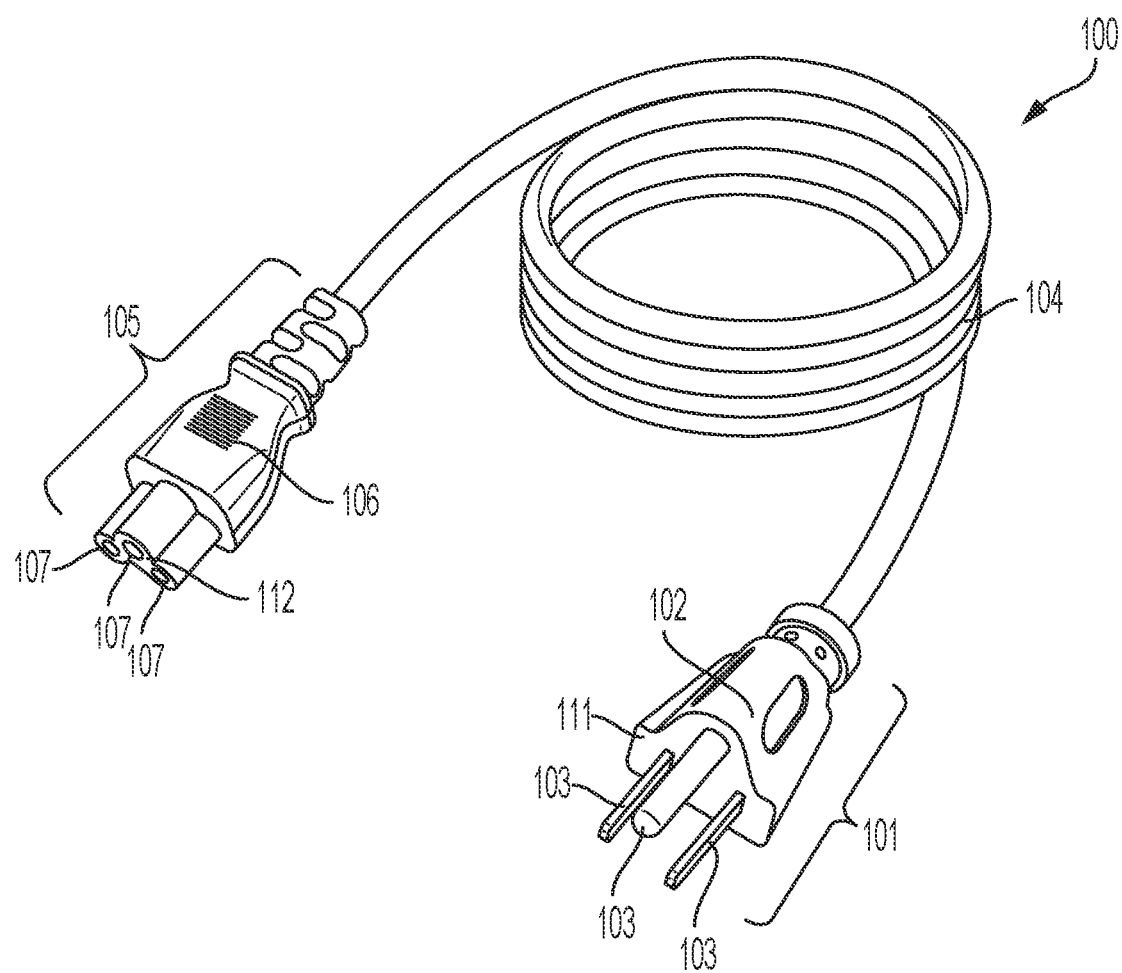
FIG. 2 schematic of a power cord assembly according to an example of the present invention.

Referring to FIG. 2, a schematic of a power cord assembly 100 according to one example of the present invention is shown. The power cord assembly 100 can be a power cord assembly of a computer or a computer adapter. The power cord assembly 100 can contain i) a plug 101 at a first end of the power cord, ii) a connector part 105 at a second end of the power cord opposite to the plug 101, iii) one or more electrically conductive wires 108 *a-e* (see FIGS. 3A and B) extending from the plug 101 to the connector part 105, iv) one or more insulators 109*a-e* (see FIGS. 3A and B) surrounding the one or more electrically conductive wires, and v) an outer jacket 104 extending from the plug to the connector part and surrounding the one or more insulators.

The plug 101 can be configured to be connected, e.g. electrically connected, to a power source. The power source can be any suitable power source, including but not limited to wall power outlets. The plug 101 contain a shell 102, and one or more electrically conductive prong(s) 103. Although 3 electrically conductive prongs are shown in FIG. 2, plugs having less than 3 (such as 2) or more than 3 electrically conductive prongs can readily be made and are contemplated in the context of the present invention. The electrically conductive prongs 103 can be configured to be extendable into an electrical outlet, e.g. wall power outlet, wherein the electrically conductive prongs extends away from a surface 111 of the shell. The shell 102 can contain a thermoplastic block co-polymer elastomer, such as a PBT-PTMO block co-polymer and/or a thermoplastic block co-polymer elastomer containing resin composition, described herein. In some aspects, 95 wt. % to 100 wt. %, or about 100 wt. % of the shell 102 can be comprised of the thermoplastic block co-polymer elastomer and/or the resin composition. In some aspects, 10 wt. % to 70 wt. %, or 25 wt. % to 65 wt. %, or at least any one of, equal to any one of, or between any two of 10, 15, 20, 25, 30, 35, 40, 45, 50, 55, 60, 65 and 70 wt. % of the plug can be renewably sourced and/or chemically recycled.

The connector part 105 can be configured to be connected to an electrical or electronic device, such as a computer or an adapter, such as an AC adapter of a computer. The connector part 105 can contain a shell 106 and at least one electrically conductive receiver or prong configured to electrically contact a conductive prong or an receiver of an electrical or electronic device. Referring to FIG. 2 a connector with 3 electrically conductive receiver 107 is shown. Although 3 electrically conductive receivers are shown, connector part having less than 3 (such as 2) or more than 3 electrically conductive receivers can readily be made and are contemplated in the context of the present invention. Although connector part containing electrically conductive receivers are shown, connector part having electrically conductive prong(s) can readily be made and are contemplated in the context of the present invention. The electrically conductive receivers 107 can be configured to receive an electrically conductive prong, wherein the electrically conductive receiver 107 extends into a surface 112 of the shell 106 of the connector part 105. The shell 106 can contain a thermoplastic block co-polymer elastomer, such as a PBT-PTMO block co-polymer and/or a thermoplastic block co-polymer elastomer containing resin composition, described herein. In some aspects, 95 wt. % to 100 wt. %, or about 100 wt. % of the shell 106 can be comprised of the thermoplastic block co-polymer elastomer and/or the resin composition. In some aspects, 10 wt. % to 70 wt. %, or 25 wt. % to 65 wt. %, or at least any one of, equal to any one of, or between any two of 10, 15, 20, 25, 30, 35, 40, 45, 50, 55, 60, 65 and 70 wt. % of the connector part 105 can be renewably sourced and/or chemically recycled.

Figure 3A:
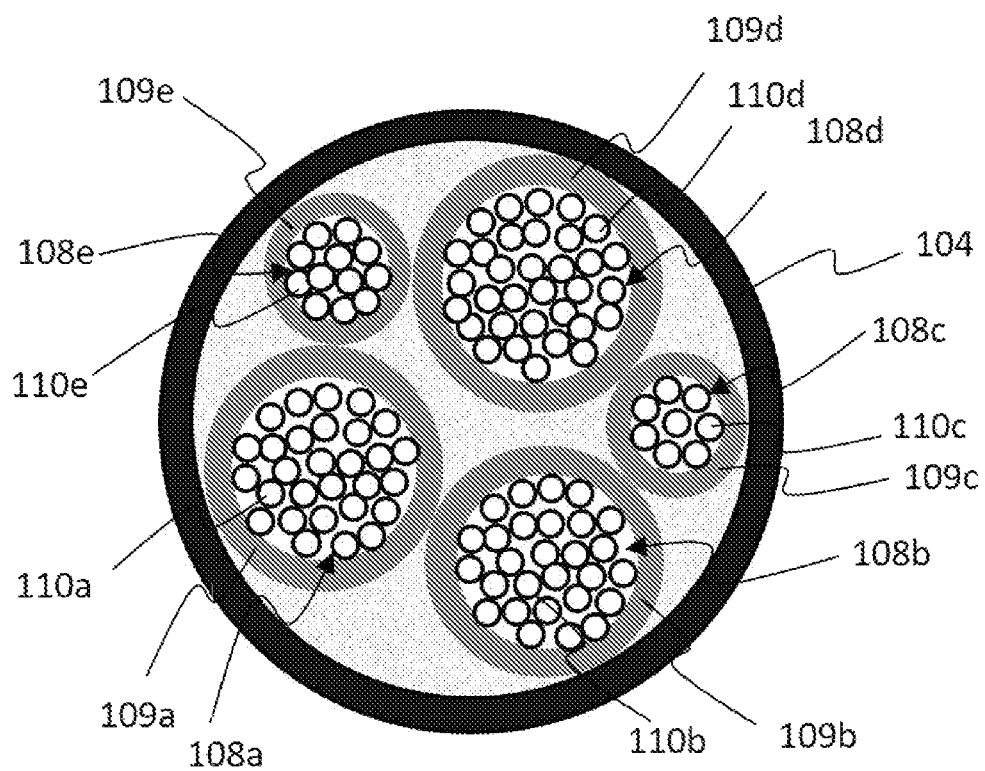
FIGS. 3A and 3B.
Figure 3B:
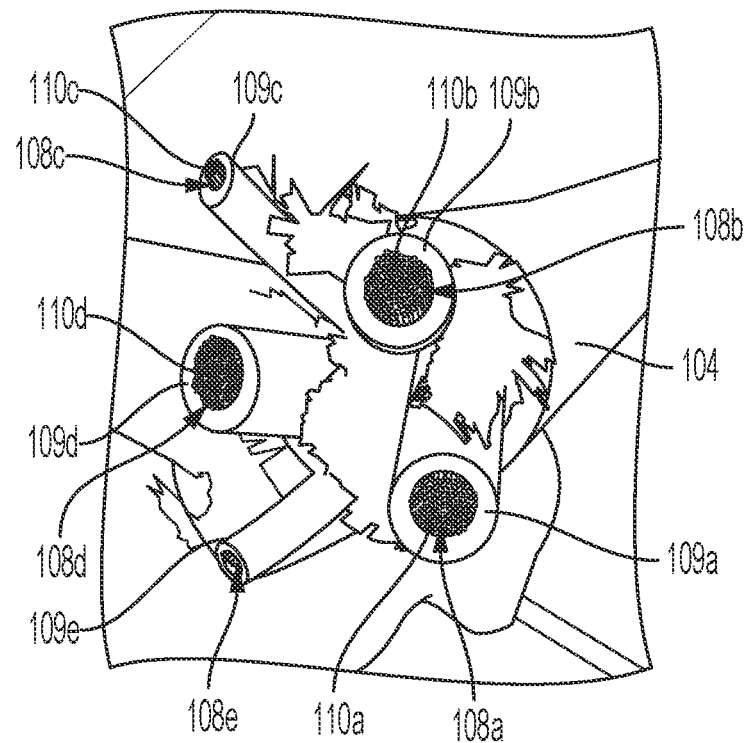

The one or more electrically conductive wires 108 *a-e* can extend from the plug 101 to the connector part 105, and can be surrounded by the one or more insulators 109 *a-e*. The one or more insulators 109 *a-e* can be surrounded by the outer jacket 104. The conductive wires 108 *a-e* can electrically connect the electrically conductive prongs 103 of the plug 101 with the electrically conductive receivers 107 of the connector part 105. FIGS. 3A and 3B show the conductive wires 108 *a-e* and the one or more insulators 109 *a-e* within the outer jacket 104. Referring to FIGS. 3A and 3B cross-sectional view and top perspective view of the outer jacket 104 of the power cord assembly is shown, showing the conductive wires 108 *a-e* and the one or more insulators 109 *a-e* within the outer jacket 104. Each of the conductive wire 108 *a-e* can contain a plurality of, such as a bundle of metallic wires 110*a-e*. In some aspects, the metallic wires can contain metallic copper (Cu). In some aspects, at least a portion of the Cu can be recycled Cu. In some aspects, 10 wt. % to 90 wt. %, or 20 wt. % to 60 wt. %, or at least any one of, equal to any one of, or between any two of 10, 15, 20, 25, 30, 35, 40, 45, 50, 55, 60, 65, 70, 75, 80, 85 and 90 wt. % of the Cu in the conductive wires can be recycled Cu.

In some aspects, each of the electrically conductive wires 108*a-e*, or at least a portion of the electrically conductive wires can be surrounded and insulated by an insulator. Referring to FIGS. 3A and 3B, insulators 109*a-e*, surrounding the electrically conductive wires 108*a-e* is shown. The insulators 109*a-e* independently can contain a thermoplastic block co-polymer elastomer, such as a PBT-PTMO block co-polymer and/or a thermoplastic block co-polymer elastomer containing resin composition, described herein. In some aspects, independently 95 wt. % to 100 wt. %, or about 100 wt. % of the insulator(s) 109*a-e* can be comprised of the thermoplastic block co-polymer elastomer and/or the resin composition. In some aspects, independently 25 wt. % to 75 wt. %, or at least any one of, equal to any one of, or between any two of 25, 30, 35, 40, 45, 50, 55, 60, 65, 70, and 75 wt. % of the insulator(s) 109*a-e* can be renewably sourced and/or chemically recycled.

The outer jacket 104 can surround the electrically conductive wires 108*a-e* and the insulators 109*a-e*. Referring to FIG. 2, outer jacket 104, surrounding the electrically conductive wires 108*a-e* and insulators 109*a-e* is shown, The outer jacket 104 can contain a thermoplastic block co-polymer elastomer, such as a PBT-PTMO block co-polymer and/or a thermoplastic block co-polymer elastomer containing resin composition, described herein. In some aspects, 95 wt. % to 100 wt. %, or about 100 wt. % of the outer jacket 104 can be comprised of the thermoplastic block co-polymer elastomer and/or the resin composition. In some aspects, 30 wt. % to 70 wt. % of the outer jacket 104 can be renewably sourced and/or chemically recycled.

In some aspects, the total renewable content and chemically recycled content of the power cord assembly can be 25 wt. % to 65 wt. % or at least any one of, equal to any one of, or between any two of 25, 30, 35, 40, 45, 50, 55, 60, and 65 wt. %.

In the context of the present invention, at least the following 20 aspects are described. Aspect 1 is directed to a power cord assembly comprising: a plug at a first end of the power cord configured to be connected to a power source; a connector part at a second end of the power cord opposite to the plug and configured to be connected to an electronic device; one or more electrically conductive wires extending from the plug to the connector part; one or more insulators surrounding the one or more electrically conductive wires; and an outer jacket extending from the plug to the connector part and surrounding the one or more insulators, wherein at least one of the plug, the connector part, the insulator, or the outer jacket comprises a thermoplastic block co-polymer elastomer having hard block and soft block segments, wherein the hard block segments comprise a first renewably sourced polymer or a first polymer comprising a chemically recycled monomeric unit, wherein the soft block segments comprise a second renewably sourced polymer or a second polymer comprising a chemically recycled monomeric unit, and wherein the total renewable content and chemically recycled content of the power cord assembly is 25 wt. % to 65 wt. %. Aspect 2 is directed to the power cord assembly of aspect 1, wherein the total renewable content and chemically recycled content of the thermoplastic block co-polymer elastomer is 20 wt. % to 90 wt. %. Aspect 3 is directed to the power cord assembly of any one of aspects 1 to 2, wherein the power cord assembly is free of or essentially free of polyvinyl chloride (PVC). Aspect 4 is directed to the power cord assembly of any one of aspects 1 to 3, wherein the power cord assembly is free of or essentially free of halogens. Aspect 5 is directed to the power cord assembly of any one of aspects 1 to 4, wherein: the thermoplastic block co-polymer elastomer is a polybutylene terephthalate (PBT)—polytetramethyleneoxide (PTMO) block copolymer, the hard block segments comprise PBT and the soft block segments comprise PTMO, the PBT is a reaction product of polymerizing 1,4 butane diol (BDO) with terephthalic acid, wherein the BDO is obtained, at least in part, from a first bio-renewable source and/or wherein the terephthalic acid is chemically recycled terephthalic acid, and optionally the PTMO is a reaction product of polymerizing 1,4-BDO, obtained, at least in part, from a second bio-renewable source. Aspect 6 is directed to the power cord assembly of aspect 5, wherein the first and second bio-renewable source is independently tall oil, caster beans, sugar, lignocellulose, waste carbon dioxide ($CO_2$), or glycerol. Aspect 7 is directed to the power cord assembly of any one of aspects 1 to 6, wherein the thermoplastic block co-polymer elastomer is comprised in a composition. Aspect 8 is directed to the power cord assembly of aspect 7, wherein the composition further comprises a flame retardant. Aspect 9 is directed to the power cord assembly of aspect 8, wherein the flame retardant is obtained from a renewable source. Aspect 10 is directed to the power cord assembly of aspect 9, wherein the flame retardant is a non-halogenated phosphorus containing flame retardant obtained from bio based chemicals. Aspect 11 is directed to the power cord assembly of any one of aspects 7 to 10, wherein the composition further comprises an additive selected from the group pigments, plasticizers, antioxidants, UV-stabilizers, heat stabilizers, dye enhancing agents, lubricant, mold release agents, crystal nucleating agents, fluidability-improving agents, antistatic agents, anti-drip agents or any combination thereof. Aspect 12 is directed to the power cord assembly of any one of aspects 7 to 11, wherein the composition has any one of, any combination of, or all of the following properties: a density of 1.0 g/cc to 1.2 g/cc at 23° C. measured in accordance with ISO 1183; a tensile modulus equal to or greater than 30 MPa, preferably 36 MPa to 70 MPa at 23° C., as measured in accordance with ISO 527 at 5 mm/min; a tensile strength at break equal to or greater than 8 MPa, preferably 8.5 MPa to 11 MPa at 23° C., as measured in accordance with ISO 527 at 5 mm/min; and a tensile elongation at break equal to or greater than 300%, at 23° C., as measured in accordance with ISO 527 at test speed of 5 mm/min Aspect 13 is directed to the power cord assembly of any one of aspects 1 to 12, wherein the one or more electrically conductive wires comprises recycled copper (Cu). Aspect 14 is directed to the power cord assembly of aspect 13, wherein the one or more Cu wires has a total recycled Cu content of 20 wt. % to 60 wt. %. Aspect 15 is directed to the power cord assembly of any one of aspects 1 to 14, wherein the plug comprises the thermoplastic block co-polymer elastomer. Aspect 16 is directed to the power cord assembly of any one of aspects 1 to 15, wherein the connector part comprises the thermoplastic block co-polymer elastomer. Aspect 17 is directed to the power cord assembly of any one of aspects 1 to 16, wherein the plug, the connector part, the insulator, and the outer jacket each comprise the thermoplastic block co-polymer elastomer. Aspect 18 is directed to a plug for a power cord assembly, the plug comprising: a shell; and at least one electrically conductive prong configured to be extendable into an electrical outlet, wherein the electrically conductive prong extends away from a surface of the shell, wherein the shell comprises a thermoplastic block co-polymer elastomer having hard block and soft block segments, wherein the hard block segments comprise a first renewably sourced polymer or a first polymer comprising a chemically recycled monomeric unit, wherein the soft block segments comprise a second renewably sourced polymer or a second polymer comprising a chemically recycled monomeric unit, and wherein total renewable and chemically recycled content of the plug can be 10 wt. % to 70 wt. %. Aspect 19 is directed to a connector for a power cord assembly, the connector comprising: a shell; and at least one electrically conductive receiver configured to receive an electrically conductive prong, wherein the electrically conductive receiver extends into a surface of the shell, wherein the shell comprises a thermoplastic block co-polymer elastomer having hard block and soft block segments, wherein the hard block segments comprise a first renewably sourced polymer or a first polymer comprising a chemically recycled monomeric unit, wherein the soft block segments comprise a second renewably sourced polymer or a second polymer comprising a chemically recycled monomeric unit, and wherein total renewable and chemically recycled content of the connector can be 10 wt. % to 70 wt. %. Aspect 20 is directed to the plug or connector of any one of aspects 18 or 19, wherein the plug or connector is free of or essentially free of polyvinyl chloride (PVC).

EXAMPLES

The present invention will be described in greater detail by way of specific examples. The following examples are offered for illustrative purposes only, and are not intended to limit the invention in any manner Those of skill in the art will readily recognize a variety of noncritical parameters which can be changed or modified to yield essentially the same results.

Example 1

Resin Composition

A PBT-PTMO block co-polymer was obtained from renewably sourced 1,4-BDO and chemically recycled terephthalic acid. A power cord assembly containing a plug, a connector part, five electrically conductive wires extending from the plug to the connector part, insulators surrounding each of the wires and an outer jacket surrounding the insulators, was made. The plug contained a shell and three electrically conductive prongs. The connector contained a shell and three electrically conductive receivers.

100 wt. % of the plug shell was comprised of the PBT-PTMO block co-polymer. 100 wt. % of the connector part shell was comprised of the PBT-PTMO block co-polymer. 100 wt. % of the insulators was comprised of the PBT-PTMO block co-polymer. 100 wt. % of the outer jacket was comprised of the PBT-PTMO block co-polymer. The electrically conductive wires were made of recycled Cu. 60 wt. % of the power cord assembly is renewably sourced and chemically recycled.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A power cord assembly comprising:
a plug at a first end of the power cord configured to be connected to a power source;
a connector part at a second end of the power cord opposite to the plug and configured to be connected to an electronic device;
one or more electrically conductive wires extending from the plug to the connector part;
one or more insulators surrounding the one or more electrically conductive wires; and
an outer jacket extending from the plug to the connector part and surrounding the one or more insulators,
wherein at least one of the plug, the connector part, the one or more insulators, or the outer jacket comprises a polybutylene terephthalate (PBT)—polytetramethyleneoxide (PTMO) block copolymer having hard block and soft block segments, wherein the hard block segments comprise PBT and the soft block segments comprise PTMO,
wherein the hard block segments comprise a first renewably sourced polymer obtained, at least in part, from a first bio-renewable source or a first polymer comprising a chemically recycled monomeric unit obtained, at least in part, from the first bio-renewable source,
wherein the soft block segments comprise a second, different renewably sourced polymer obtained, at least in part, from a second, different bio-renewable source or a second polymer comprising a chemically recycled monomeric unit obtained, at least in part, from the second, different bio-renewable source, and
wherein the total renewable content and chemically recycled content of the power cord assembly is 25 wt. % to 65 wt. %.

2. The power cord assembly of claim 1, wherein the total renewable content and chemically recycled content of the thermoplastic block co-polymer elastomer is 20 wt. % to 90 wt. %.

3. The power cord assembly of claim 1, wherein the power cord assembly is free of or essentially free of polyvinyl chloride (PVC).

4. The power cord assembly of claim 1, wherein the power cord assembly is free of or essentially free of halogens.

5. The power cord assembly of claim 1, wherein:
the PBT is a reaction product of polymerizing 1,4 butane diol (BDO) with terephthalic acid, wherein the BDO is obtained, at least in part, from the first bio-renewable source and/or wherein the terephthalic acid is chemically recycled terephthalic acid, and optionally the PTMO is a reaction product of polymerizing 1,4-BDO, obtained, at least in part, from the second bio-renewable source.

6. The power cord assembly of claim 5, wherein the first and second bio-renewable source is independently tall oil, caster beans, sugar, lignocellulose, waste carbon dioxide ($CO_2$), or glycerol.

7. The power cord assembly of claim 1, wherein the thermoplastic block co-polymer elastomer is comprised in a composition.

8. The power cord assembly of claim 7, wherein the composition further comprises a flame retardant.

9. The power cord assembly of claim 8, wherein the flame retardant is obtained from a renewable source.

10. The power cord assembly of claim 9, wherein the flame retardant is a non-halogenated phosphorus containing flame retardant obtained from bio based chemicals.

11. The power cord assembly of claim 7, wherein the composition further comprises an additive selected from the group pigments, plasticizers, antioxidants, UV-stabilizers, heat stabilizers, dye enhancing agents, lubricant, mold release agents, crystal nucleating agents, fluidability-improving agents, antistatic agents, anti-drip agents or any combination thereof.

12. The power cord assembly of claim 7, wherein the composition has any one of, any combination of, or all of the following properties:

a density of 1.0 g/cc to 1.2 g/cc at 23° C. measured in accordance with ISO 1183;

a tensile modulus equal to or greater than 30 MPa, preferably 36 MPa to 70 MPa at 23° C., as measured in accordance with ISO 527 at 5 mm/min;

a tensile strength at break equal to or greater than 8 MPa, preferably 8.5 MPa to 11 MPa at 23° C., as measured in accordance with ISO 527 at 5 mm/min; and a tensile elongation at break equal to or greater than 300%, at 23° C., as measured in accordance with ISO 527 at test speed of 5 mm/min.

13. The power cord assembly of claim 1, wherein the one or more electrically conductive wires comprises recycled copper (Cu).

14. The power cord assembly of claim 13, wherein the one or more Cu wires has a total recycled Cu content of 20 wt. % to 60 wt. %.

15. The power cord assembly of claim 1, wherein the plug comprises the thermoplastic block co-polymer elastomer.

16. The power cord assembly of claim 1, wherein the connector part comprises the thermoplastic block co-polymer elastomer.

17. The power cord assembly of claim 1, wherein the plug, the connector part, the one or more insulators, and the outer jacket each comprise the thermoplastic block co-polymer elastomer.

* * * * *